US009953147B2

(12) United States Patent
Doren

(10) Patent No.: US 9,953,147 B2
(45) Date of Patent: Apr. 24, 2018

(54) COMPUTER-IMPLEMENTED SYSTEM AND METHOD FOR CORRELATING ACTIVITY WITHIN A USER INTERFACE WITH SPECIAL INFORMATION

(71) Applicant: Intellisist, Inc., Seattle, WA (US)

(72) Inventor: G. Kevin Doren, Mercer Island, WA (US)

(73) Assignee: Intellisist, Inc., Seattle, WA (US)

( * ) Notice: Subject to any disclaimer, the term of this patent is extended or adjusted under 35 U.S.C. 154(b) by 281 days.

(21) Appl. No.: 14/281,842

(22) Filed: May 19, 2014

(65) Prior Publication Data

US 2014/0331331 A1 Nov. 6, 2014

Related U.S. Application Data

(63) Continuation of application No. 13/871,903, filed on Apr. 26, 2013, now Pat. No. 8,731,938, which is a
(Continued)

(51) Int. Cl.
*G10L 21/00* (2013.01)
*G06F 21/32* (2013.01)
(Continued)

(52) U.S. Cl.
CPC .......... *G06F 21/32* (2013.01); *G06F 21/6263* (2013.01); *G10L 15/26* (2013.01);
(Continued)

(58) Field of Classification Search
CPC .......... G06F 21/31; G06F 21/32; G06F 21/34; G06F 21/6245; G06F 21/6263; G06F 21/62; G06F 21/83; G06F 21/60; G06F 21/6254; G06F 17/30289; G06F 21/6218; G06F 21/84; G06F 2221/2119; G06F 21/602; G06F 17/30867; G06F 21/316; G06F 21/50; G06F 21/554; G06F 21/6209; G06F 2221/032; G06F 2221/2107; G06F 2221/2111; G06F 2221/2147; G06F 21/64; G06F 21/78; G06F 21/82; G06F 2221/2137; G06F 21/35; G06F 2221/2101; G06F 2221/2113; G06F 2221/2149; G06F 21/6227; G06F 21/72; G06F 21/73;
(Continued)

(56) References Cited

U.S. PATENT DOCUMENTS 5,298,890 A 3/1994 Kanamaru et al.
5,388,252 A 2/1995 Dreste
(Continued)

*Primary Examiner* — Abdelali Serrou
(74) *Attorney, Agent, or Firm* — Patrick J. S. Inouye; Krista A. Wittman

(57) ABSTRACT

A computer-implemented system and method for correlating activity within a user interface with special information is provided. A user interface with data entry fields is provided. One or more of the data entry fields is designated for special information. A first screen shot of the user interface is captured, and a second screen shot of the user interface is captured at a later time. The first and second screen shots are compared. A change comprising at least a portion of an entry within one of the data entry fields for special information in the second screen shot is identified between the first and second screen shots. The entry is rendered unintelligible.

18 Claims, 12 Drawing Sheets

Related U.S. Application Data continuation of application No. 11/477,899, filed on Jun. 28, 2006, now Pat. No. 8,433,915.

(51) Int. Cl.
  *G06F 21/62* (2013.01)
  *G10L 15/26* (2006.01)
  *G10L 17/22* (2013.01)
  *H04M 3/42* (2006.01)

(52) U.S. Cl.
  CPC .............. *G10L 17/22* (2013.01); *G10L 21/00* (2013.01); *H04M 3/42221* (2013.01)

(58) Field of Classification Search
  CPC ..... G06F 2221/2129; G06F 2221/2143; G06F 17/03; G06F 17/30539; G06F 2221/2141; G06F 3/04895; G06F 3/1454; G10L 15/26; G10L 21/00; G10L 17/22
  See application file for complete search history.

(56) References Cited

U.S. PATENT DOCUMENTS

| | | | |
|---|---|---|---|
| 5,485,569 A * | 1/1996 | Goldman | G06F 8/38 715/202 |
| 5,621,454 A | 4/1997 | Ellis et al. | |
| 5,732,394 A | 3/1998 | Nakadai et al. | |
| 5,790,798 A | 8/1998 | Beckett et al. | |
| 5,815,138 A | 9/1998 | Tsubaki et al. | |
| 5,818,930 A | 10/1998 | Mark | |
| 5,825,871 A | 10/1998 | Mark | |
| 5,870,079 A | 2/1999 | Hennessy | |
| 5,900,877 A | 5/1999 | Weiss et al. | |
| 5,974,385 A | 10/1999 | Ponting et al. | |
| 6,128,380 A | 10/2000 | Shaffer et al. | |
| 6,263,049 B1 | 7/2001 | Kuhn | |
| 6,269,332 B1 | 7/2001 | Choo et al. | |
| 6,270,011 B1 * | 8/2001 | Gottfried | G06F 21/32 235/379 |
| 6,370,574 B1 | 4/2002 | House et al. | |
| 6,477,492 B1 | 11/2002 | Connor | |
| 6,519,699 B2 | 2/2003 | Lu et al. | |
| 6,583,781 B1 * | 6/2003 | Joshi | G06F 3/04883 345/156 |
| 6,754,155 B1 | 6/2004 | Hayashi et al. | |
| 6,865,162 B1 | 3/2005 | Clemm | |
| 7,097,108 B2 | 8/2006 | Zellner | |
| 7,502,741 B2 | 3/2009 | Finke et al. | |
| 7,599,847 B2 | 10/2009 | Block et al. | |
| 7,774,854 B1 | 8/2010 | Watson et al. | |
| 2002/0065668 A1 * | 5/2002 | Goodwin, III | G06F 21/6245 705/51 |
| 2002/0083192 A1 | 6/2002 | Alisuag | |
| 2003/0046554 A1 | 3/2003 | Leydier et al. | |
| 2003/0079224 A1 | 4/2003 | Komar et al. | |
| 2003/0120936 A1 | 6/2003 | Farris et al. | |
| 2003/0125958 A1 | 7/2003 | Alpdemir et al. | |
| 2004/0006478 A1 | 1/2004 | Alpdemir et al. | |
| 2004/0064317 A1 | 4/2004 | Othmer et al. | |
| 2004/0068661 A1 | 4/2004 | Dettinger et al. | |
| 2004/0123134 A1 * | 6/2004 | Sasich | G06T 1/005 713/176 |
| 2004/0181679 A1 | 9/2004 | Dettinger et al. | |
| 2004/0210637 A1 | 10/2004 | Loveland | |
| 2005/0114379 A1 | 5/2005 | Lee | |
| 2005/0132070 A1 * | 6/2005 | Redlich | G06F 21/6209 709/228 |
| 2005/0159164 A1 | 7/2005 | Leedom, Jr. | |
| 2005/0204312 A1 | 9/2005 | Rosel | |
| 2005/0238174 A1 | 10/2005 | Kreitzer | |
| 2005/0256956 A1 | 11/2005 | Littlefield et al. | |
| 2005/0278630 A1 | 12/2005 | Bracey | |
| 2005/0280502 A1 * | 12/2005 | Bell | G07C 9/00158 340/5.83 |
| 2005/0286736 A1 | 12/2005 | Rhoads | |
| 2006/0041428 A1 | 2/2006 | Fritsch et al. | |
| 2006/0056626 A1 * | 3/2006 | Keohane | G06F 21/84 380/206 |
| 2006/0111904 A1 | 5/2006 | Wasserblat | |
| 2006/0118614 A1 | 6/2006 | Rose | |
| 2006/0129948 A1 * | 6/2006 | Hamzy | G06F 21/84 715/790 |
| 2006/0190263 A1 | 8/2006 | Finke et al. | |
| 2006/0210071 A1 | 9/2006 | Chandran et al. | |
| 2007/0016419 A1 | 1/2007 | Lee et al. | |
| 2007/0071223 A1 | 3/2007 | Lee et al. | |
| 2007/0076312 A1 | 4/2007 | Jordan | |
| 2007/0124243 A1 * | 5/2007 | Hamada | G09C 5/00 705/50 |
| 2007/0124601 A1 * | 5/2007 | Singh | G06F 21/31 713/189 |
| 2007/0195945 A1 | 8/2007 | Korenblit et al. | |
| 2008/0049933 A1 * | 2/2008 | Kuroda | G11B 7/00736 380/201 |
| 2008/0229230 A1 * | 9/2008 | Grigoriev | G06F 21/82 715/780 |
| 2013/0104041 A1 * | 4/2013 | Seshagiri | G06F 11/3414 715/704 |

\* cited by examiner

COMPUTER-IMPLEMENTED SYSTEM AND METHOD FOR CORRELATING ACTIVITY WITHIN A USER INTERFACE WITH SPECIAL INFORMATION

CROSS-REFERENCE TO RELATED APPLICATIONS

This patent application is a continuation of U.S. Pat. No. 8,731,938, issued May 20, 2014, which is a continuation of U.S. Pat. No. 8,433,915, issued Apr. 30, 2013, the disclosure of which is incorporated by reference.

RELATED APPLICATIONS

This patent application is related to commonly assigned U.S. patent application Ser. No. 11/181,572, entitled "Selective Security Masking Within Recorded Speech Utilizing Speech Recognition Techniques."

FIELD

Embodiments of the invention relate generally to limiting access to information and, more specifically, to a computer-implemented system and method for correlating activity within a user interface with special information.

BACKGROUND

Personal information is routinely collected during transactions in modern society. Recordings of conversations are made in a variety of situations such as customer-agent interactions during contacts within the context of call centers, emergency service interactions (911 calls, etc.), and a myriad of other transactions that require information to flow from one entity to another.

During these transactions, personal information such as social security numbers, credit card numbers, bank account numbers, personal identification numbers (PIN), names, addresses, club numbers, frequent flier numbers, etc. is sensitive and can harm the person to whom the information pertains if the information is misused. This can present a problem.

Such sensitive information can be stored in a variety of locations or transferred to other parties for various reasons, all of which can place the information at risk of compromise by others. Hackers have become proficient at compromising databases, which house such sensitive information. Accounts can be pilfered, the identity of an individual can be stolen, and the individual can be placed in physical harm by unscrupulous actors. This can present a problem.

Information collected during the business transactions mentioned above can be transferred to entities for analysis. It has become a widespread business practice to record calls between customers and agents of a business during business transactions. Such recorded information is often times transferred to a party for analysis. An example is the quality review of a recording that contains personal information. While it is the intent of the data owner to transfer the data to a party for analysis, it is often the case that the party should not have access to the personal information contained within a transaction. This can present a problem.

Current attempts at securing sensitive information within recorded conversations or recorded speech have been directed to manually monitoring the speech and then subsequently deleting the sensitive information. Such a practice can be expensive in light of the volume of such data that is currently being created. Such manual censoring of recorded conversations and speech is not economically practical to meet all of the current need in the marketplace. This can present a problem.

Data which is considered sensitive, personal, confidential, or that should otherwise be secured from recognition can vary from one business to another. For example, in a medical context where a disease should be kept separate from a patient's name and address, the patient's name and address are considered to be the sensitive information that should not be readily available to others apart from the data owner. Conversely, a medical context can require that the disease be considered to be sensitive information. In some settings, such as in financial service settings, the customer's name and address are not necessarily the sensitive information, rather it is typically the customer's account number, personal identification number (PIN), etc. that is considered sensitive and should be secured. Variability of what is sensitive information, within a setting and from one setting to another, complicates handling sensitive information since a uniform definition of sensitive information does not exist. This can present a problem.

SUMMARY

An embodiment provides a computer-implemented system and method for correlating activity within a user interface with special information. A user interface with data entry fields is provided. One or more of the data entry fields is designated for special information. A first screen shot of the user interface is captured, and a second screen shot of the user interface is captured at a later time. The first and second screen shots are compared. A change comprising at least a portion of an entry within one of the data entry fields for special information in the second screen shot is identified between the first and second screen shots. The entry is rendered unintelligible.

BRIEF DESCRIPTION OF THE DRAWINGS

The invention may best be understood by referring to the following description and accompanying drawings that are used to illustrate embodiments of the invention. The invention is illustrated by way of example in the embodiments and is not limited in the figures of the accompanying drawings in which like references indicate similar elements.

DETAILED DESCRIPTION

In the following detailed description of embodiments of the invention, reference is made to the accompanying drawings in which like references indicate similar elements and in which are shown by way of illustrations, specific embodiments in which the invention may be practiced. These embodiments are described in sufficient detail to enable those of skill in the art to practice the invention. In other instances, well-known circuits, structures, and techniques have not been shown in detail in order not to obscure the understanding of this description. The following detailed description is, therefore, not to be taken in a limiting sense and the scope of the invention is defined only by the appended claims.

Apparatuses and methods are described to secure information contained within voice recordings.

Figure 1:
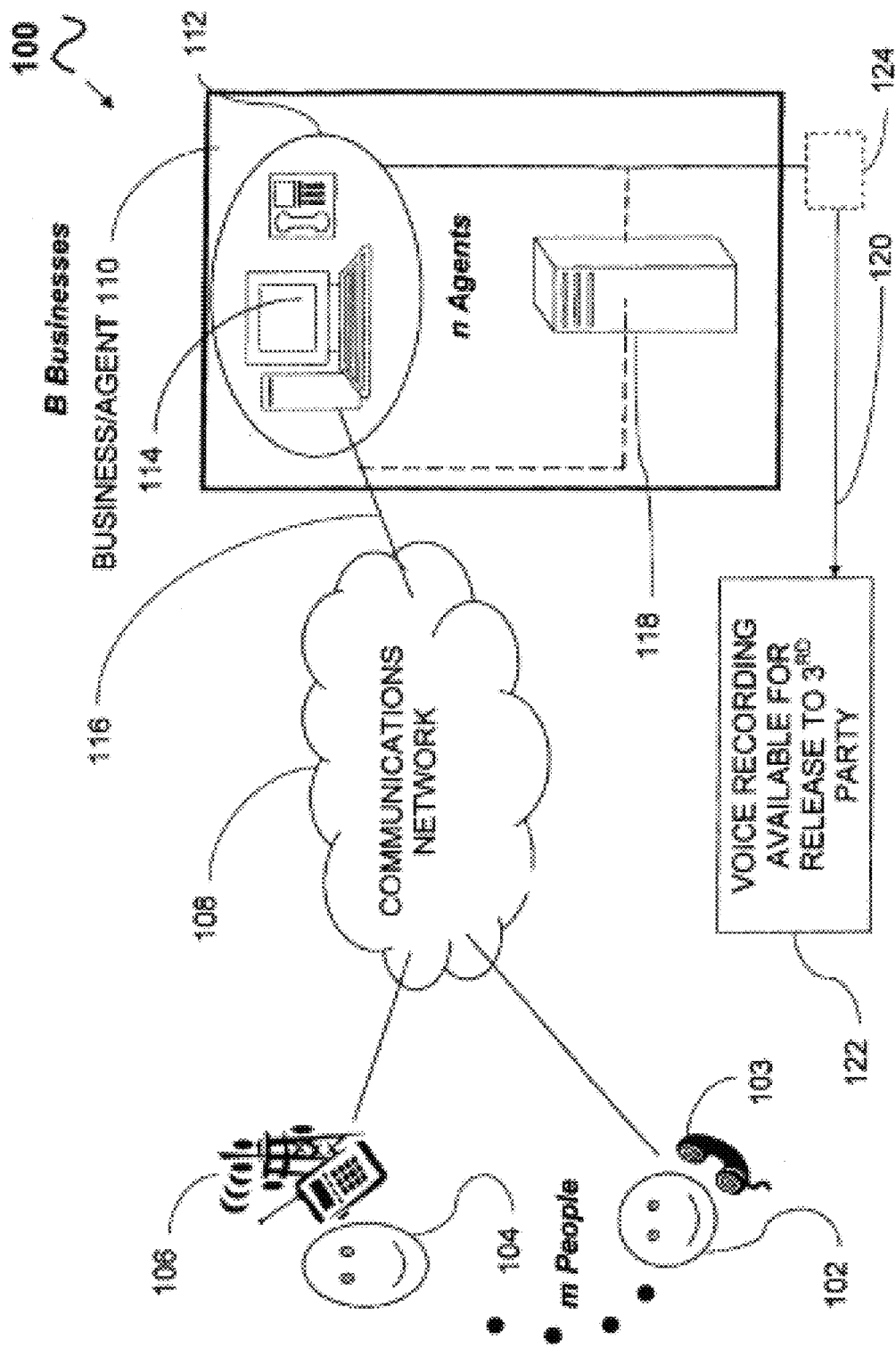
FIG. 1 illustrates a system for processing speech signals and/or voice recordings, according to embodiments of the invention.

FIG. 1 illustrates, generally at 100, a system for processing speech signals and/or voice recordings, according to embodiments of the invention. With reference to FIG. 1, a person 102 or 104, capable of making a voice utterance, interacts with a business entity 110. The interaction utilizes a communications device, such as an audio communications device 103 and a communications network 108 to communicate with a business entity 110. The person 102 or 104 (one of a plurality of m people) controls the system 100 by initiating an interaction with the communications device (e.g., 103); thereby, providing a signal 116 containing information to the business entity 110. Note that the system 100 can be controlled simultaneously be more than one person (i.e., a plurality of m people), since it is often the case that a number of people, represented by 102 or 104 can be in communication simultaneously with the business entity 110. A communications device 106 can include wireless functionality at various points along a path between the person 104 and the business entity 110. Wireless functionality can include, but is not limited to, personal area network(s), cellular telephone network(s), satellite telephone network(s), etc. The system 100 is capable of simultaneous control by m people as illustrated by the architecture shown in FIG. 1.

In a broad implementation within system 100, a general number of m people interact with a general number of n agents of B businesses. No limitation is implied by FIG. 1 and it will be noted that FIG. 1 is scalable to accommodate any number of m people interacting with n agents of B businesses. For clarity during this description of embodiments, examples are given with reference to a person and a business entity; however, it will be noted that no limitation is implied by such reference.

As used herein, the term "business entity" is afforded broad meaning and can take on a variety of forms, wherein a variety of goods and/or services can be provided to a person by a business entity. The term "business entity" is described more fully below.

The business entity 110 often provides personnel, who represent the business and are commonly referred to as "agents." An "agent" is usually equipped with a workstation 112. The workstation 112 can include a data processing system that includes an information display 114 as well as a system for producing a voice recording from the interaction that occurs between a person and the business entity 110. A data processing/telecommunications system can be employed per the workstation 112; examples of such systems are 'described below in conjunction with FIG. 2. Without loss of generality, hence forth in this description of embodiments, the business entity 110 will be referred to alternatively as "business entity" or "agent." No limitation is implied thereby, "agent" is to be afforded broad meaning and includes any person or automated system authorized to represent the business when interacting with people.

Terms such as "person," "people," "human(s)," "customer(s)," "caller" are also to be afforded broad meaning and include without limitation customers of the business, both present and potential customers, as well as employees and agents of the business who engage in transactions with the business.

In general, a person is considered to be a repository of special information; some of this special information comes into the possession of the business entity during an interaction between the person and the business entity. This special information can be referred to as personal, private, confidential, sensitive, secret, etc. The term used to label the special information does not limit embodiments of the invention described herein.

Labels such as "personal," "private," "confidential," "sensitive," etc. are used within different settings to describe special information to which access should be limited. It will be explained further below that special information in one case may not be identical with special information in another case. Hence, exactly what information is to be considered "special" is defined by the context of use (use-case) and is covered within embodiments of the invention.

An interaction results in one or more utterances being made during a conversation between a person, such as 102 or 104 and the business entity 110. Recording equipment is used to make a voice recording of the utterances made during the interaction between the caller and business entity. A business agent's workstation 112 can include voice recording, telecommunications, and data processing system recourses, which are described more fully below conjunction with FIG. 2. The data processing resources can include an information display 114 on which information obtained during the course of the conversation is entered by the agent (not shown) of the business. Alternatively, a data processing resource 118 can provide automated conversations with the person 102 or 104 functioning as an "electronic agent" of the business entity 110.

Activity derived from the agent's workstation 112, during the interaction with the person may be used to process a speech signal contained within a voice recording or a speech signal that is dynamically received (input) into a system in real-time or near real-time. Note however, that such cases of real-time and near real-time do not impose limitations and are used as examples, in this description of embodiments. As used in this description of embodiments, "processing" renders special information pertaining to the person unintelligible. The processed voice recording 120 is then capable of being transferred to third parties at 122, thereby preventing a third party from accessing the special information. The voice recording can be processed to render unintelligible the special information at a variety of places, for example, within the agent's workstation 112, within a data processing resource 118 or within a data processing resource 124. Data processing/telecommunications resources are described more fully below in conjunction with FIG. 2.

As mentioned above, an interaction between a person and a business entity can occur in a variety of ways, within which information flows. Many contacts between a person and a business entity occur in the context of, communications utilizing electronic means, such as a telephone, a cellular telephone, a microphone, a computer, and voice over Internet Protocol (VOIP) technology, etc. Assisted by such communication systems, two people, more than two people or at least one person and an automated system can carry on a conversation, where one person or automated system propounds questions and the other responds to the questions. During the conversation, special information is uttered by the person, generally in reply to questions or prompts from another person or automated system representing the business entity. A live person or automated system representing the business entity can be considered an interface of the business entity. In another example, an interaction occurs in a setting where a business entity provides an automated interface to interact with human customers. In such a setting, a human contacts a business entity and encounters an automated interface or system interface that propounds a series of questions, which elicit answers from the human. The answers can contain special information pertaining to the human.

Figure 2:
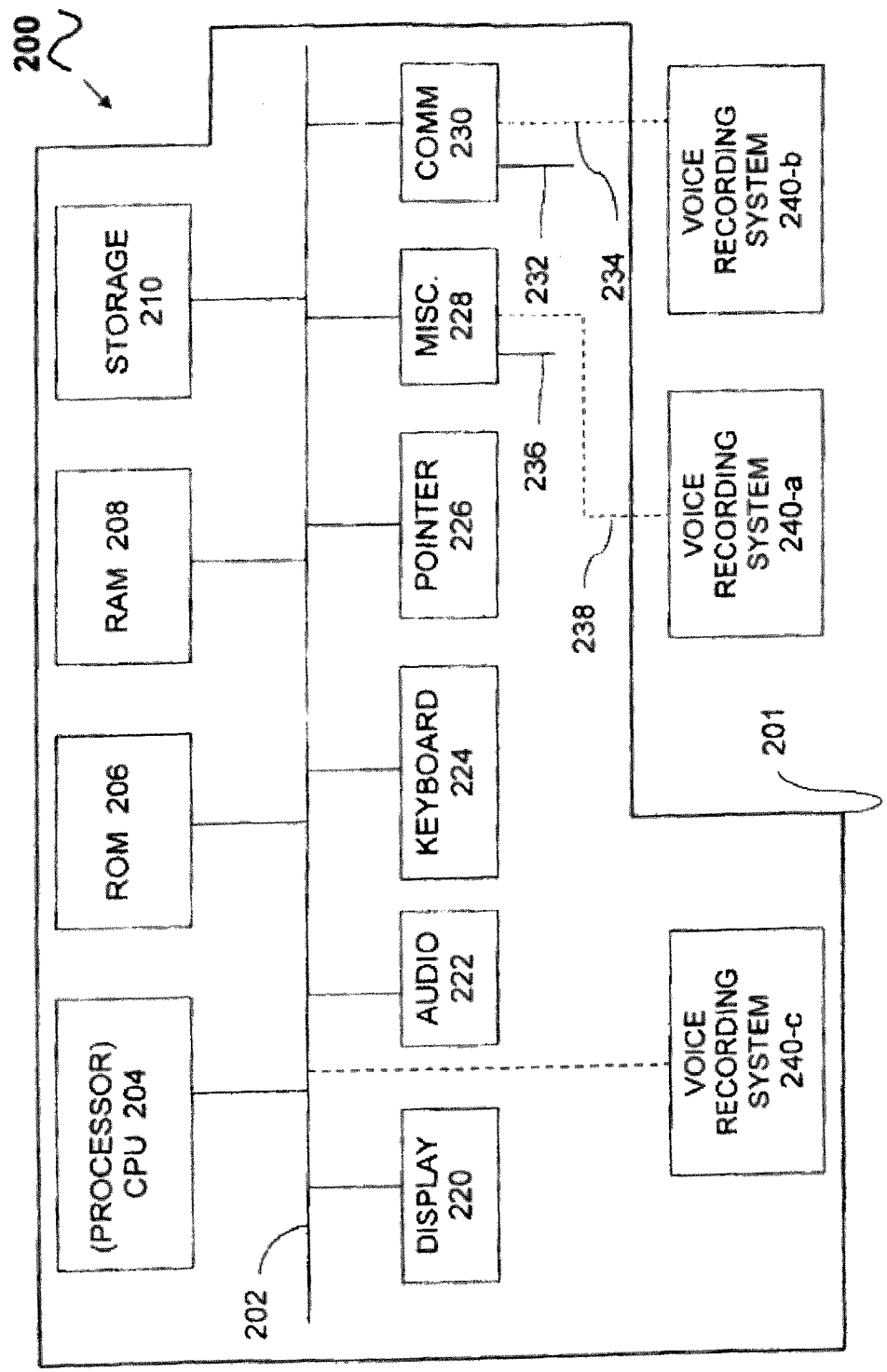
FIG. 2 illustrates a block diagram of a computer system in which embodiments of the invention can be implemented.

FIG. 2 illustrates, generally at 200, a block diagram of a computer system 201, which has been referred to variously above as a data processing system, a telecommunications system, and/or a voice recording system, with which embodiments of the invention can be implemented. The block diagram is a high level conceptual representation and may be implemented in a variety of ways and by various architectures. A bus system 202 interconnects a processor, also known as a Central Processing Unit (CPU) 204, a Read Only Memory (ROM) 206, a Random Access Memory (RAM) 208, a storage 210, a display 220, an audio 222, a keyboard 224, a pointer 226, miscellaneous input/output (I/O) devices 228, communications 230 and optional voice' recording systems 240-a, 240-b, and 240-c. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210 may be Compact Disc (CD), Digital Versatile Disk (DVD), hard disks (HD), optical disks, tape, flash, memory sticks, video recorders, etc. The display 220 can be, for example, a cathode ray tube (CRT) display, a flat panel type of display, a touch screen display, a display with voice activated fields, etc. Note that depending upon the actual implementation of a computer system, the computer system may include some, all, more, or a rearrangement of components in the block diagram. It will be noted by those of skill in the art that the functionality of any of the voice recording systems 240-a, 240-b or 240-c can be provided by other components of the computer system 201. This means that a computer system 201 can be configured to record voice data without a dedicated system indicated explicitly as 240-a, 240-b, or 240-c. Thus, many variations on the system of FIG. 2 are possible.

In various embodiments, a pointing device such as a stylus is used in conjunction with a touch screen, for example, via 220, thereby allowing an agent to input data through a user interface that is presented to the agent on the display 220 as facilitated by a software program that is executed by the processor 204. Alternatively,' the agent can input data utilizing the keyboard 224 and/or a pointing device 226. A "mouse" is an example of a commonly known pointing device. Alternatively, the software program can be configured to provide a voice activated field(s) within the user interface that is presented to the agent on the display 220. Audio input from the agent can be received utilizing the audio 222. Such a user interface configured for voice activation or voice prompt can be useful when an agent is physically challenged and cannot accomplish data input using a keyboard, a mouse. Note that voice functionality can also be useful to a user who is not physically challenged, such functionality can enhance the user friendliness of a user interface in general.

Connection with a network is obtained via 232 and 230, as is recognized by those of skill in the art, which enables the data processing device 201 to communicate with other data processing devices in remote locations. For example a voice recording system 240-b can be connected at 234 to communications 230, thereby allowing the voice recording system 240-b to have communications with the computer system 201. A voice recording system 240-a can be connected at 238 via a miscellaneous input/output device 228, thereby allowing the voice recording system 240-a to have communications with the computer system 201. It is understood that "communications" between the computer system 201 and any of the voice recording systems can represent a one-way flow of information or a bidirectional flow of information.

Figure 3:
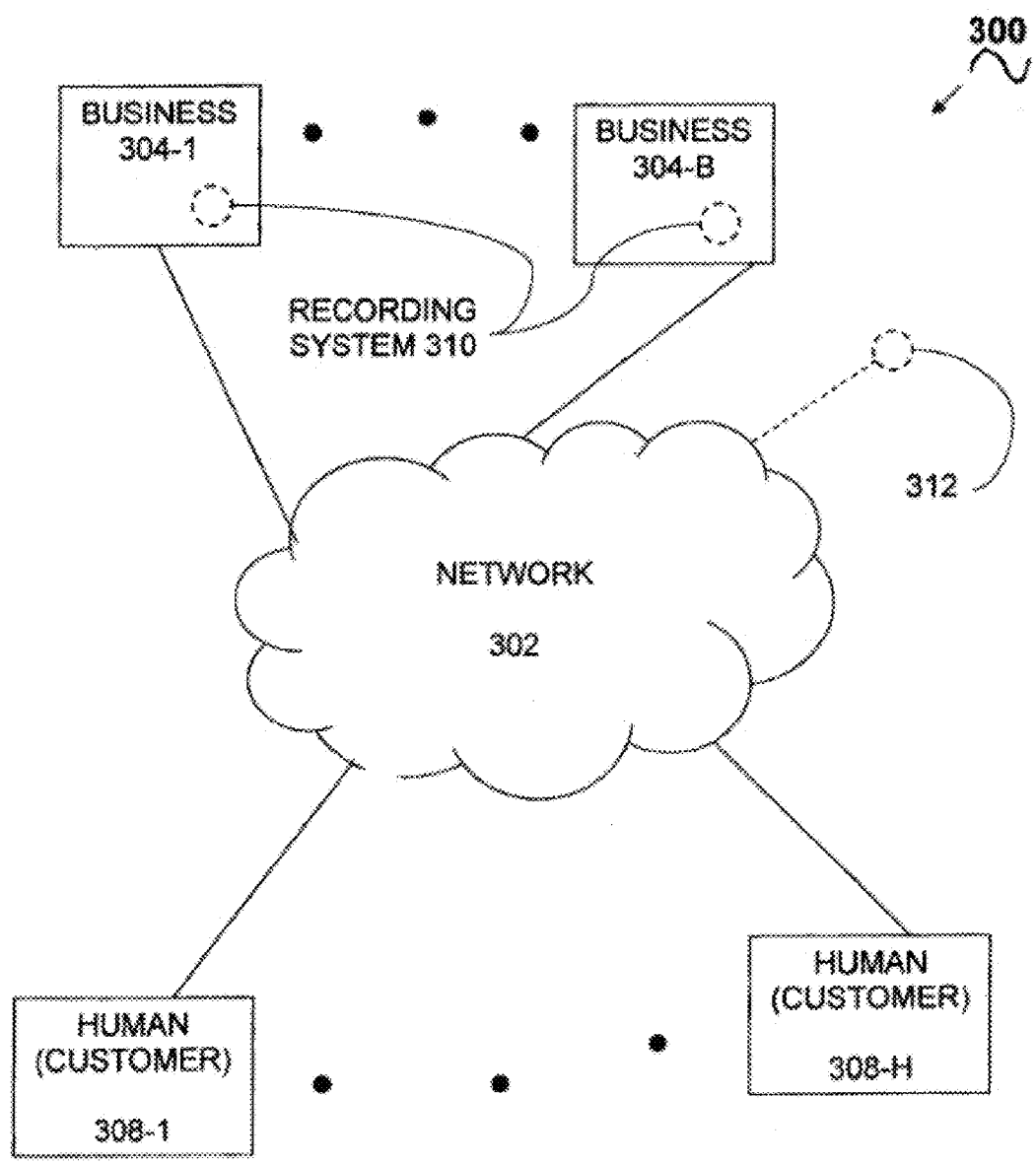
FIG. 3 illustrates a network environment in which embodiments of the invention can be implemented.

FIG. 3 illustrates, generally at 300, a network environment in which embodiments of the invention can be implemented. The network environment 300 has a network 302 that permits "H" humans, 308-1 through 308-H to communicate with "B" businesses 304-1 through 304-B. One or more data processing devices (computer systems), as previously described in FIG. 1 and/or FIG. 2, are resident at, or in communication with, each business location, i.e., 304-1 through 304-B. One or more of the data processing devices can be referred to as servers and one or more of the data processing devices can function as "electronic agents." One or more of the businesses 304-1 through 304-B can be connected to each other via a network 302, which may be, for example, a corporate based network. Note that alternatively the network 302 might be or include one or more of: the Internet, a Local Area Network (LAN), Wide Area Network (WAN), satellite link, fiber network, cable network, or a combination of these and/or others. Resident at each business location or at other points in the network, the servers may represent, for example, disk storage systems alone or storage and computing resources. Likewise, one or more voice recording systems 310 can be located within the businesses 304-1 through 304-B or one or more voice recording systems, such as 312, can be accessible to one or more businesses via the network 302. The methods and apparatuses described herein may be applied to essentially any type of communicating means or device whether local or remote, such as a LAN, a WAN, a system bus, etc.

Referring back to FIG. 1, at 122 the modified or processed voice recording(s) is available to be used by people or entities who are not supposed to have access to the human's special information. Rendering segments of the voice recording unintelligible (whether in analog or digital form or in a textual representation of the voice recording) can occur in a variety of ways, some of which are reversible and others of which are not 'reversible. Rendering unintelligible will be described below in more detail in conjunction with the figures that follow.

Alternatively, or in addition to the processing described above, the voice recording can be associated with an identifier (metadata). The identifier can indicate that special information either is or is not contained within the voice recording. The identifier can contain various elements of metadata, such as data that indicates how the special information has been processed. For example, the identifier can indicate that the special information has been encrypted, deleted, masked, etc. The identifier can provide information relative to the use-case under which the voice recording was obtained, the data owner, the data custodian, etc. Identifiers can also indicate that a voice recording is "clean," i.e., free of special information relative to a particular use-case.

As mentioned above, a business entity can take on a variety of forms. Embodiments of the invention are not limited by a form of a business entity and the examples of business entities provided herein do not limit embodiments of the invention. The examples of business entities given herein are provided for illustration purposes only and it is expected that embodiments of the invention will be applicable to business entities that are as of yet unknown.

For example, one form of business entity is the retail or wholesale establishment providing goods and/or services to customers. Examples include but are not limited to entertainments services (gambling, sports, etc.); financial services (banking, investment, etc.); real estate and related services, transportation providers such as train, plane, boat, etc.; insurance; hard goods; soft goods; services such as cleaning, maintenance, etc. Another area is professional services, such as organizations that dispense medical or legal services to patients, clients, callers, etc. Yet another area is providers of public services, such as emergency services summoned through 911 calls, municipal services, social services, such as but not limited to various departments of health and human services (DHHS), departments of health and family services (DHFS), local, state, and federal government offices, agencies, etc. In still other cases the goods and/or services can be user defined for a particular situation.

Each of the business entities described above represents a use-case (some represent the same use-case, others represent a different use-case), in which a suite of special information is established. The logical setting of the use-case together with applicable laws will influence the information that is considered to be special and to which access will be restricted by the system within appropriate embodiments of the invention. Embodiments of the invention are applicable to use-cases which are both presently known and unknown. As used herein, "use-case" refers broadly to a scenario wherein special information pertaining to a user is obtained.

Entry of a person's special information into a field of a user interface occurs within a window of time. A typical scenario that describes the process begins with an agent (for example, a live person or an "electronic agent") propounding a question to a person, such as "Can I have your social security number please?" The person speaks in reply to the question and the agent begins to input the answer spoken by the person. A marker is then correlated with the entry of such special information. For example, a marker can correspond to any time or times coherently associated with the window of time corresponding to the entry of the special information. Such times include, but are not limited to, the beginning of the entry, the end of the entry, and any time there-between or related thereto. An example of a time related thereto is an offset in time from the window of time corresponding to the entry of the special' information, etc. It will be noted that a typical session between a person and an agent, during such an interaction, will result in a plurality of utterances of special information. Therefore, it is to be expected that a series of markers will be created and used to render unintelligent a series of segments within a voice recording between the person and the agent.

Figure 4:
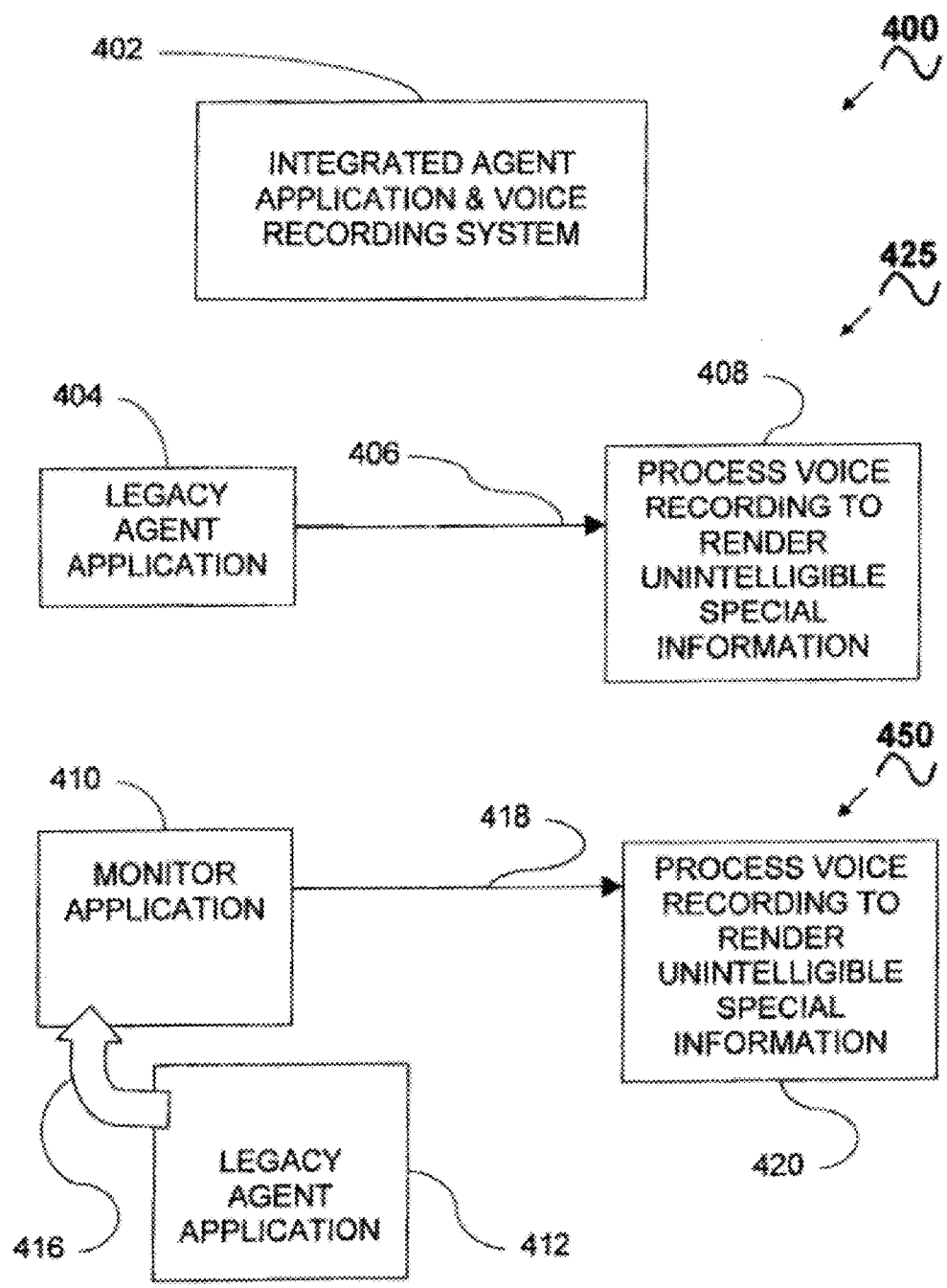
FIG. 4 illustrates various architectures for implementing embodiments of the invention.

FIG. 4 illustrates various architectures, generally at 400, for implementing embodiments of the invention. With reference to FIG. 4, a block 402 represents an integrated agent software/hardware application that produces a processed voice recording, thus rendering a person's special information unintelligible. In various embodiments, fields on a user interface that correspond to a person's special information are used to create "markers" when an agent, takes action that is associated therewith. For example, the beginning of entry of special information into such a field establishes a "marker." The marker is related to the time of entry of the special information. The marker is used by the integrated agent software/hardware application to mark a section of the voice recording for processing. Processing renders unintelligible, the section of the voice recording associated with the marker. Note that an integrated agent software/hardware application has the times of occurrences of events readily available for use in processing a voice recording. Such a situation is most readily obtained when an application program has been designed to associate input events (e.g., keystroke and mouse locations) with their corresponding times of occurrence and the time bases used for the data input and the recording system are either the same or the relationship between them is known.

Architecture shown at 425 can be used, in various embodiments, to process voice recordings when a configuration of agent equipment (software/hardware) does not place the data input system in common control with the voice recording system. At 425 a legacy agent application (software and/or hardware) 404 provides for the input of special information and creates a marker(s) associated therewith. The marker(s) is passed via 406 to a voice recording system and the voice recording is processed 408 utilizing the marker to render the person's special information unintelligible.

In a configuration of agent equipment that does not associate data input events (e.g., keystroke and mouse movement) with their corresponding times of occurrence, architecture as shown at 450 is used, in various embodiments, to establish the corresponding times of occurrence. The times of occurrence 416 are obtained by monitoring activity in a legacy agent application 412. The times of occurrence 418 are used to process the voice recording 420 in order to render the special information unintelligible. A legacy agent application 412 is used by an agent to enter information obtained during a conversation with a person. Such a legacy application is hosted by a system such as shown in FIG. 2 at 201. A monitor application 410 is also hosted by the system shown in FIG. 2 at 201. The monitor application 410 is used to obtain the times 416 that correspond with the entry of special information pertaining to the person. The times or "markers," 416, so obtained, are passed via 418 to process the voice recording and to render unintelligible the special information that pertains to the person at 420. Processing the special information within the voice recording can be performed by the monitor application 410, another application or the processing can be performed by another data processing system as described above in conjunction with the preceding figures. For example, the processing can be performed at remote locations by means of the network connections and/or at one or more sites remote or local to the business entity that hosted the agent application.

Throughout this description of embodiments, both a speech signal contained within a voice recording as well as a speech signal dynamically input into a system can be processed to render a person's special information unintelligible. For example, in the case of a speech signal input into a system, the speech signal can be processed before the voice recording is created. Such processing can be performed for example, in real-time or near real-time, note however that either of these cases imply no limitation on embodiments of the invention. In this case, a marker is used to start or to stop processing the speech signal, thereby creating a voice recording that has at least some of the person's special information rendered unintelligible.

Figure 5:
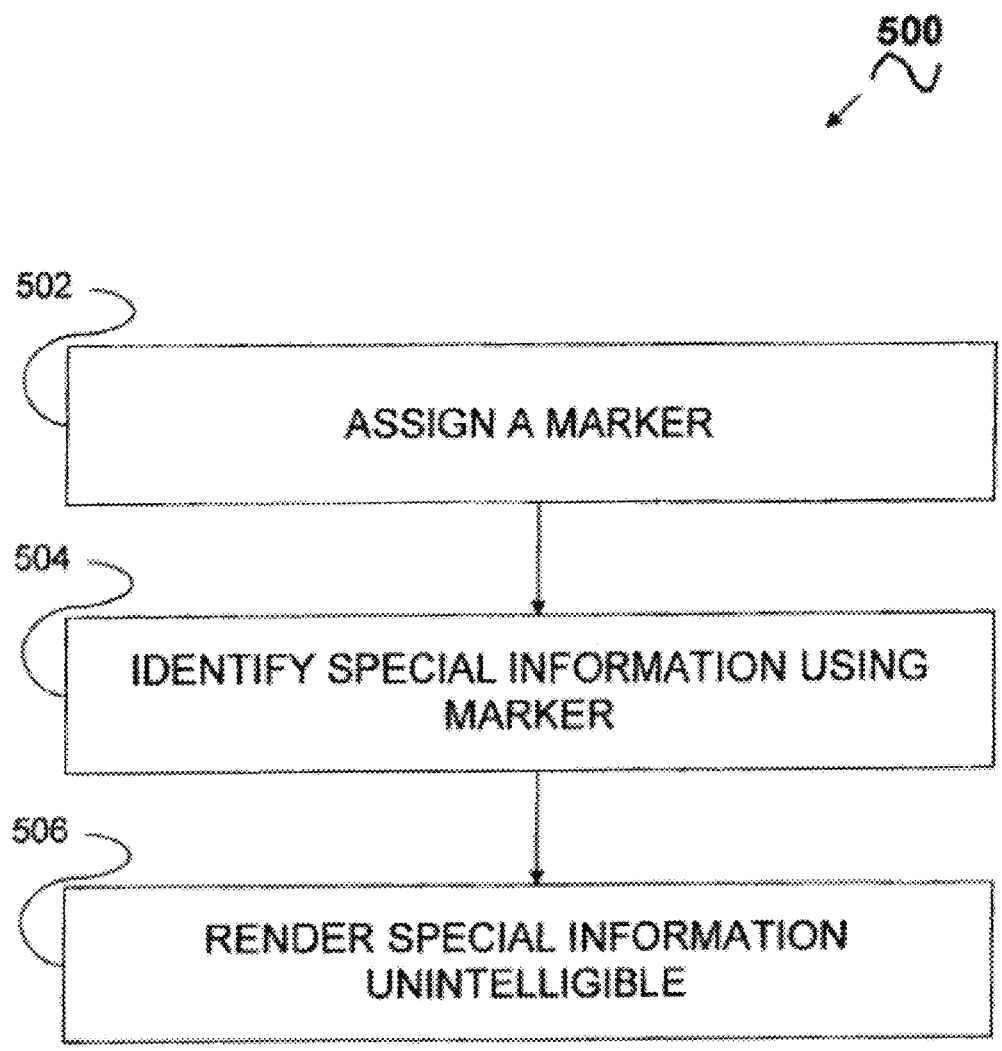
FIG. 5 displays utilizing a marker according to embodiments of the invention.

FIG. 5 displays, generally at 500, utilizing a marker according to embodiments of the invention. With reference to FIG. 5, at a block 502 a marker is assigned to special information that is obtained from a person during an interaction with an agent possibly in conjunction with activity in a user interface. At a block 504 the marker is used to identify special information within the voice recording of the interaction. At a block 506, the part of the voice recording corresponding to the special information uttered by the person, during the interaction, is rendered unintelligible.

Rendering unintelligible can be accomplished by recording a masking signal either over a segment(s) of the original voice recording in the location of the utterance(s) of special information so identified or by recording the masking signal in place of or mixed with a segment(s) of a speech signal, as the speech signal is input into a system. In various examples, a noise signal [white noise, pink noise, tone, zero amplitude signal (erase), etc.] is recorded, over, in place of, or mixed with the segment of the voice recording rendering the special information unintelligible. In another example, the segment of the voice recording corresponding to the utterance of special information is encrypted to render the utterance of special information unintelligible. Encryption can be reversed (decrypted) with a key if desired. Encryption and decryption are described in more detail below in figures that follow.

It will be noted that either an analog or a digital representation of the voice recording can be processed to render unintelligible the special information contained therein. Additionally, as described above, a textual representation of a voice recording can be processed to render unintelligible the elements of text that correspond with the segments of special information contained therein.

As an alternative, or in addition to the processes described in conjunction with the block 506, the voice recording can be associated with an identifier. The identifier can indicate that special information either is or is not contained within the voice recording. In various embodiments, the identifier can be configured to assist in providing the functionality described above in conjunction with the discussion in FIG. 1 above.

Figure 6:
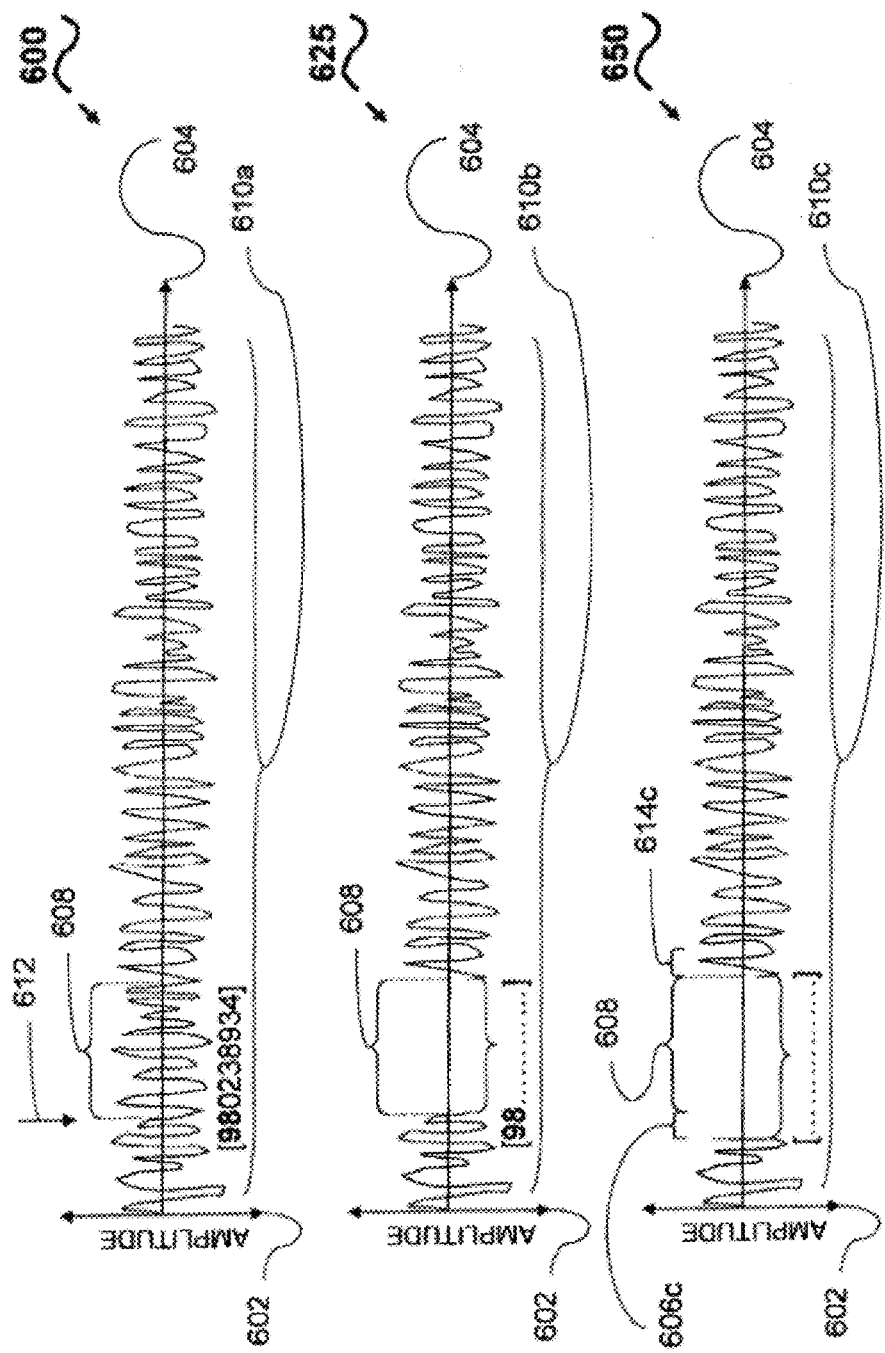
FIG. 6 illustrates processing a speech signal according to embodiments of the invention.

FIG. 6 illustrates processing a speech signal according to embodiments of the invention. With reference to FIG. 6, a speech signal 600 contains both special information pertaining to a person as well as information that is not special and hence will not be rendered unintelligible. A segment 610a of a speech signal is displayed as a waveform along a horizontal axis 604 that corresponds to "time" and along a vertical axis 602 that corresponds to "amplitude." A part of the speech signal within the segment 610a contains the special information, e.g., [980238934], which can correspond to a credit card number, a personal identification number, account number, etc. A marker, created as described above in conjunction with the preceding figures, is used to process a part of the speech signal. For example, a first marker could be associated with the beginning of entry of special information into a particular field of a user interface; such a marker is indicated at 612. A second marker can be associated with an end of entry of special information into the field. The first and second markers can be used to establish a window indicated at 608.

For the purpose of this example, the special information contained within a part of the speech signal indicated by the window 608 is shown as [0238934] in 600. The entire quantum of special information contained in the voice recording (speech signal) that corresponds with entry of special information into the field is [980238934] in 600. The segment 610a of the speech signal is processed to render the portion of the speech signal within the window 608' unintelligible. The processed speech signal is displayed in 625 as 610b.

Alternatively, a single marker can be used to define a window used to process a part of the speech signal. For example, following a determination that an agent is getting ready, is ready, or is entering information into a particular field of a user interface, such as a credit card field, a length of a window can be set from a priori knowledge of how long it takes for an average person to utter a response to a question propounded by an agent. For example, if a credit card number was requested, the next twelve (12) seconds of a speech signal can be assumed to be an utterance of special information in response to the prompt. In another example, following a prompt for a Social Security number, the next eight (8) seconds of a voice recording (speech signal) can be assumed to be an utterance of special information in response to the prompt. Thus, in various embodiments, a quantum of special information can be processed and rendered unintelligible by defining a single marker and setting a time window relative to the marker or by defining multiple markers.

Note that the embodiments of the invention presented herein can be implemented in a variety of languages. The descriptions presented herein utilize the English language; however, other languages such as Spanish, Russian, etc. are readily implemented as well. Embodiments of the invention are not limited to a particular language. The times mentioned above i.e., twelve (12) seconds to utter a credit card number and eight (8) seconds to utter a Social Security number can be different for people speaking the same language (i.e., fast talkers or slow talkers) and the times can be different in embodiments of the invention configured for languages other than English.

Markers can be created in various ways, one way described above which is based on the beginning of entry of confidential information into the field by the agent might have a latency period associated therewith. The latency period can result since a person will usually begin to speak and then after a period of time an agent will begin to enter information into a field in response to the speaking In one embodiment, this latency period can be accounted for by building into a system an offset, the offset is used to process an additional portion of a speech signal, thereby capturing the entire utterance of special information.

An example of including an offset (also referred to as a guard band) in a procedure used to process a portion of a voice recording (speech signal) associated with the onset of speaking is shown at 650 in FIG. 6. An offset is indicated at 606c. A part of the voice recording (speech signal) corresponding to an offset 606c is also processed along with the part of the voice recording (speech signal) corresponding to the window 608 to render unintelligible the entire number, e.g., [980238934] as indicated by a segment of the speech signal 610c. The guard band (offset 606c) captured the portion of the speech signal that contained "98" which could correspond to the amount of 'the speech signal that was omitted due to a speaking latency.

In the dynamic input case, in one embodiment, the offset can be accomplished by buffering the input speech signal to create a time delay for real-time or near real-time processing. The signal is then rendered unintelligible and recorded to create a voice recording.

The window 608 can also be extended beyond the length shown in FIG. 6 with a trailing guard band i.e. 614c. However, in the case of speaking latencies it will usually be the case that an agent is still typing after a person has finished speaking, therefore an extension of the length of the window 608 would most likely result in processing silence.

In a voice recording created during an interaction between a person and a business entity, the process described above is repeated throughout the voice recording to render unintelligible the parts of the voice recording that correspond to utterances of special information that pertain to the person. There is no limit on the number of parts of the voice recording that can be processed. The amount of processing will depend on the particular use-case of interest.

It will be noted that it is not always necessary to render unintelligible the exact words or the exact numbers uttered by a person when an utterance of special information occurs. For example, the numbers shown under the window 608 at 600 might not include all of the numbers that comprise for example a social security number or a credit card account number. Social security numbers consist of nine (9) digits and currently, credit card account numbers have sixteen (16) digits. Seven (7) digits are displayed under the window 608 at 600, which represent a partial acquisition, i.e., [0238934], of the special information [980238934]. However, in some use-cases, a partial acquisition can provide a sufficient amount of information, which, when rendered unintelligible, constructively renders unintelligible the item of special information.

Another use-case can present a different situation. For example, in a medical services application where an item of special information is a person's name or disease a greater degree of localization of the special information within the voice recording might be required. In such a case, guard bands and variations in a correlation function between activity in a user interface and the voice recording can be adjusted, as described below in the figures that follow.

Figure 7:
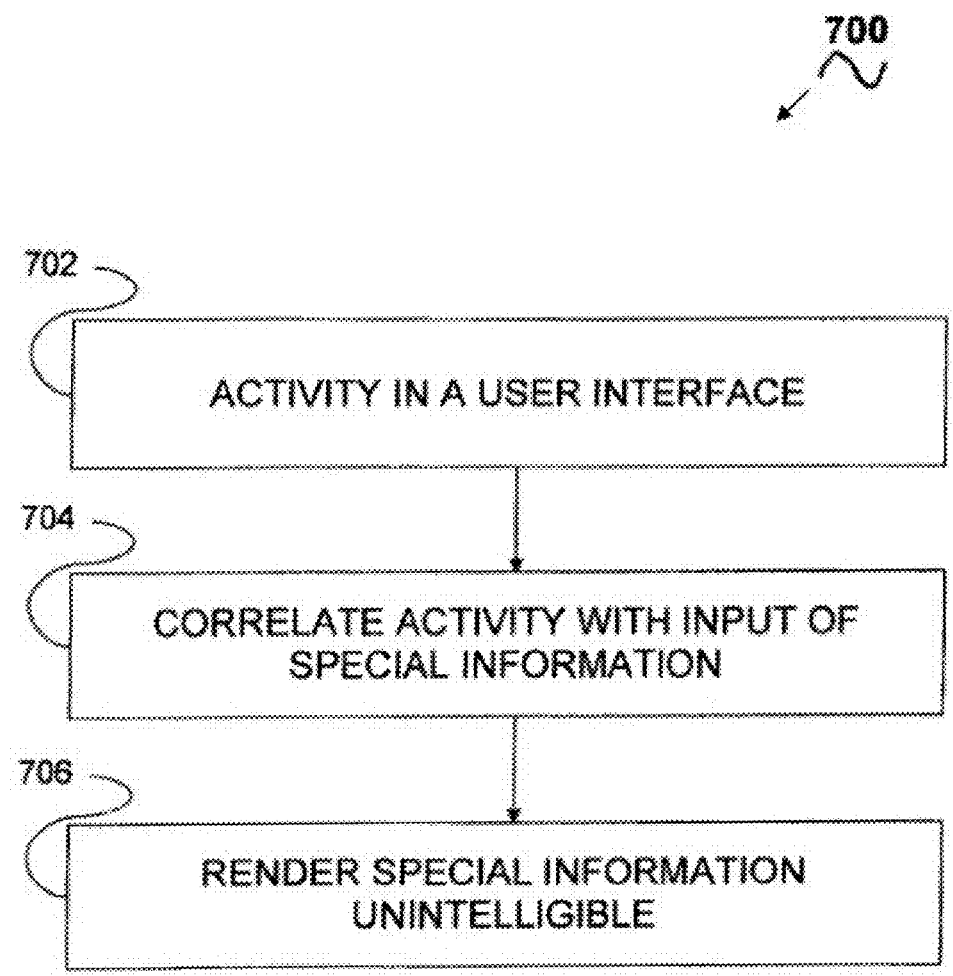
FIG. 7 illustrates correlating activity in a user interface with special information according to embodiments of the invention.

FIG. 7 illustrates, generally at 700, correlating activity in a user interface with special information according to embodiments of the invention. With reference to FIG. 7, a block 702 signifies activity in a user interface. Activity includes, but is not limited to, moving a pointing device into a field of a user interface that corresponds with special information. Special information can include, in various use-cases, bank account numbers, credit card numbers, social security numbers, addresses, diseases, etc. At a block 704, activity in the user interface is correlated with the input of special information. Correlating activity with the input of special information can include, but is not limited to, establishing that a trajectory of a pointing device, such as a mouse, is headed for a field of a user interface that is used to input special information. Establishing a trajectory is described more fully below in conjunction with FIG. 8.

In another embodiment, within a voice enabled application, an action that signifies that an input field is "active" can be detected and used to correlate activity in the user interface with the input of special information. As a result of the process occurring in block 704, a part of a voice recording is rendered unintelligible at a block 706.

In yet another embodiment, a first portion of a first image from a first screen of a user interface is compared with a second portion of a second image from a second screen of the user interface. The first and second screens of the user interface are separated in time. Analysis of image data separated in time provides information on changes that can occur within or near the fields of interest. In this example, the fields of interest are the fields within a user interface that are used to input special information about a person.

Figure 8:
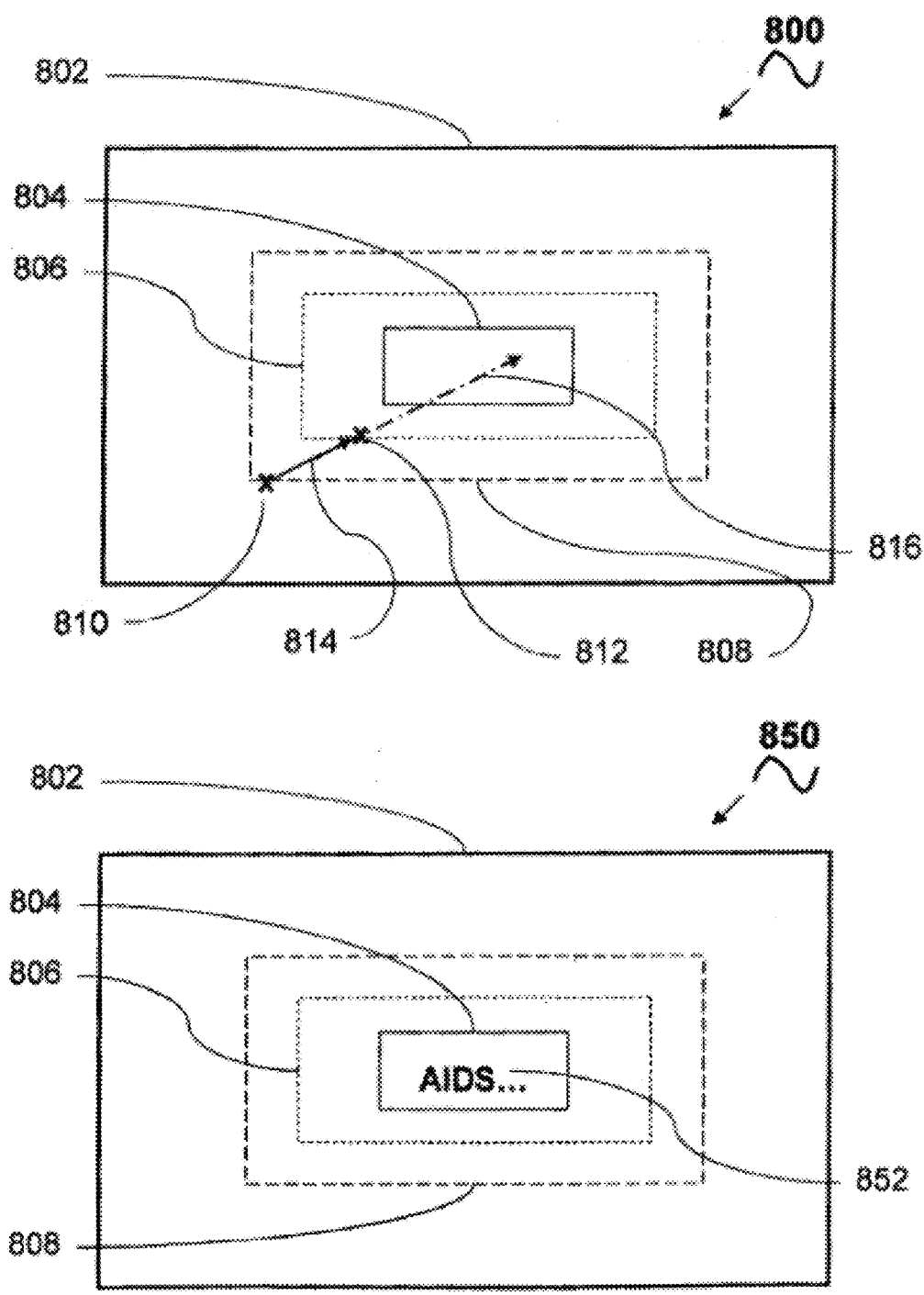
FIG. 8 depicts activity in a user interface according to embodiments of the invention.

FIG. 8 depicts activity in a user interface according to embodiments of the invention. With reference to FIG. 8, a composite view of at least two successive screens of a user interface is shown generally at 800. In one embodiment, a user interface 802 contains a field 804. Field 804 is used for the input of special information pertaining to a person. First offset distance 806 and second offset distance 808 are designated around the field 804. Activity at one or more offset distances can at times be correlated with the entry of data into the field 804.

In this example, at a time equal to $t_1$, image data corresponding or related to the image displayed on the user interface 802 is analyzed and a pointing device location is indicated at 810. At a time equal to $t_2$ ($t_2 > t_1$), image data corresponding or related to the image displayed on the user interface 802 is analyzed and the pointing device location is indicated at 812. A line 814 indicates a trajectory of the pointing device. The trajectory, indicated by the line 814, intersects the field 804 as indicated by a dashed line 816. From the foregoing analysis it can be determined that an agent is moving a pointing device in a direction of and possibly into the field 804 to enter special information into a user interface that pertains to the person.

Various criteria can be used to establish a correlation between activity within a user interface and entry of special information into a field of the user interface. For example, different correlation coefficients can be assigned to various activities within the user interface and the field 804. A value of a correlation coefficient is used to render unintelligible a part of a corresponding voice recording. For example, in one scenario, a location of a pointing device within field 804 will produce a maximum correlation which can be assigned a value of one "1" and when the pointing device is not within the field 804 a minimum correlation assigns a value of zero "0." When a correlation coefficient is equal to one "1" a part of a voice recording contemporaneously related thereto is processed to render the part unintelligible. When a correlation coefficient is equal to zero "0" the voice recording is not rendered unintelligible.

More complex correlation functions between pointing device positions and the field 804 can be created by considering other criteria, such as a direction of travel and a location of a pointing device. In an alternative scheme, a minimum correlation (i.e., zero "0") is assigned when the pointing device is located at positions furthest from the field 804 or when the pointing device is located in a different field and an agent is inputting data into the different field. A maximum correlation of one "1" can occur when the pointing device is located within the field 804. Several correlation coefficients between zero "0" and one "1" can be assigned when the pointing device (such as a mouse) is traveling between points of minimum and maximum correlation. For example, when a pointing device is located at the position 810 a correlation coefficient of 0.5 can be assigned. When the pointing device is located at the position 812 and has a trajectory that will intersect the field 804, such as indicated by the line 814, the correlation coefficient can be zero point eight "0.8." After entering an area on the user interface indicated by the first offset distance 806 (with a trajectory calculated to intersect the field 804) the correlation coefficient can be raised to zero point nine "0.9." An algorithm that computes an instantaneous correlation between a position of a pointing device and a field (used to input special information) can be configured to initiate processing a part of a voice recording when an instantaneous correlation coefficient rises above a predetermined threshold.

In various embodiments, within the example described directly above, the threshold can be set at 0.8 or 0.9 to achieve acceptable accuracy with respect to processing and rendering unintelligible a part of a voice recording containing a person's special information. Note that using a correlation function as described above can be used as a type of guard band that dynamically starts processing the voice recording based on activity that is correlated with a field used for the entry of special information that pertains to a person. A guard band derived from such activity is an "active" guard band and will depend on the logic embedded in the algorithm used to establish the correlation coefficients and the threshold used to initiate processing a voice recording.

Many alternative schemes exist. For example, in one embodiment, within a user interface that is designed around a series of fields that are accessed via a "TAB" key, a maximum correlation coefficient of one "1" is assigned when an agent has "tabbed" into a designated field used for inputting special information about a person. A minimum correlation coefficient can exist when the agent is not in a field designated for special information. Processing a part of a voice recording to render the part unintelligible will occur when the instantaneous correlation coefficient equals one "1" and processing will not occur when the instantaneous correlation coefficient equals zero "0."

The user interface 802 is displayed at 850 in a state that corresponds to a time $t_3$ ($t_3 > t_2 > t_1$) to show the result of the special information entered by the agent at 852. In the use-case depicted in 850, the special information is the name of a disease, i.e., "AIDS." The events displayed in FIG. 8, can be correlated with a voice recording that is recorded between a person and the agent during an interaction to mask the name of the disease, in this example, "AIDS," within the voice recording.

Figure 9:
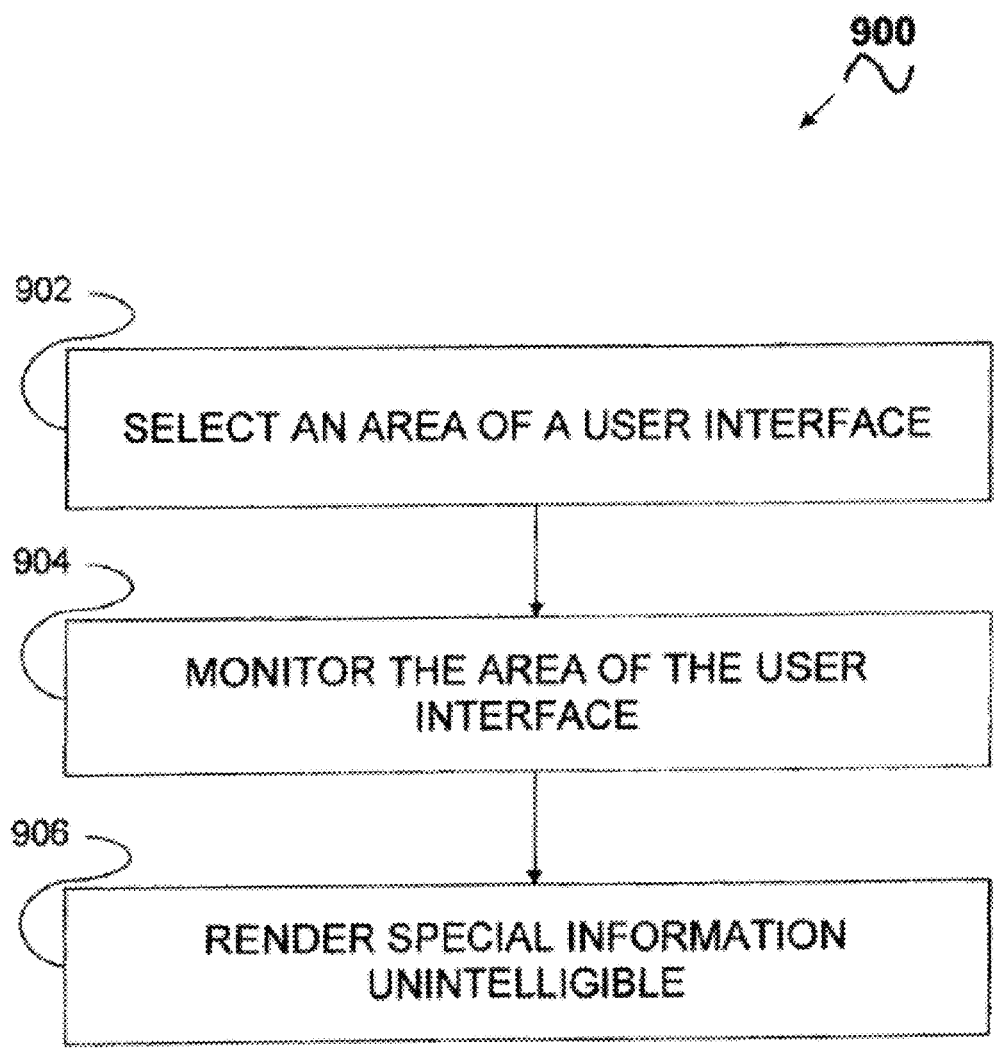
FIG. 9 shows monitoring a user interface according to embodiments of the invention.

FIG. 9 shows monitoring a user interface, generally at 900, according to embodiments of the invention. With reference to FIG. 9, an area of a user interface is selected at a block 902. The area of the user interface selected at the block 902 can be an area within the user interface that is designated for the input of special information that pertains to a person. There can be one or more of such areas within a user interface designated for input of special information. The number of such areas will depend on a particular use-case contemplated by a user interface. The area of the user interface selected at the block 902 is monitored at the block 904. Based on the activity detected from the monitoring occurring at the block 904, special information pertaining to a person can be rendered unintelligible at a block 906.

Monitoring at the block 904 can occur in a variety of ways. In one way all of the activity that occurs within a user interface can be monitored and then filtered to extract only the activity that pertains to fields that are used for inputting special information. Filtering can be performed based on activity occurring within a particular region on a user interface, such a region is known in the art as "a window." Monitoring can be implemented from a first software program (known also in the art as an application program) executing on a processor to process a part of a voice recording that corresponds with a person's special information.

Alternatively, in various embodiments, a user interface is displayed on an information display, which results from a first software program (known also in the art as an application program) executing as a first process on a processor. A second software program or application executing as a second process on the processor or a different processor can perform the monitoring indicated at block 904 apart from any need to modify the first software program. In the WINDOWS® family of operating systems such monitoring is accomplished using WINDOWS® "hooks."

Figure 10:
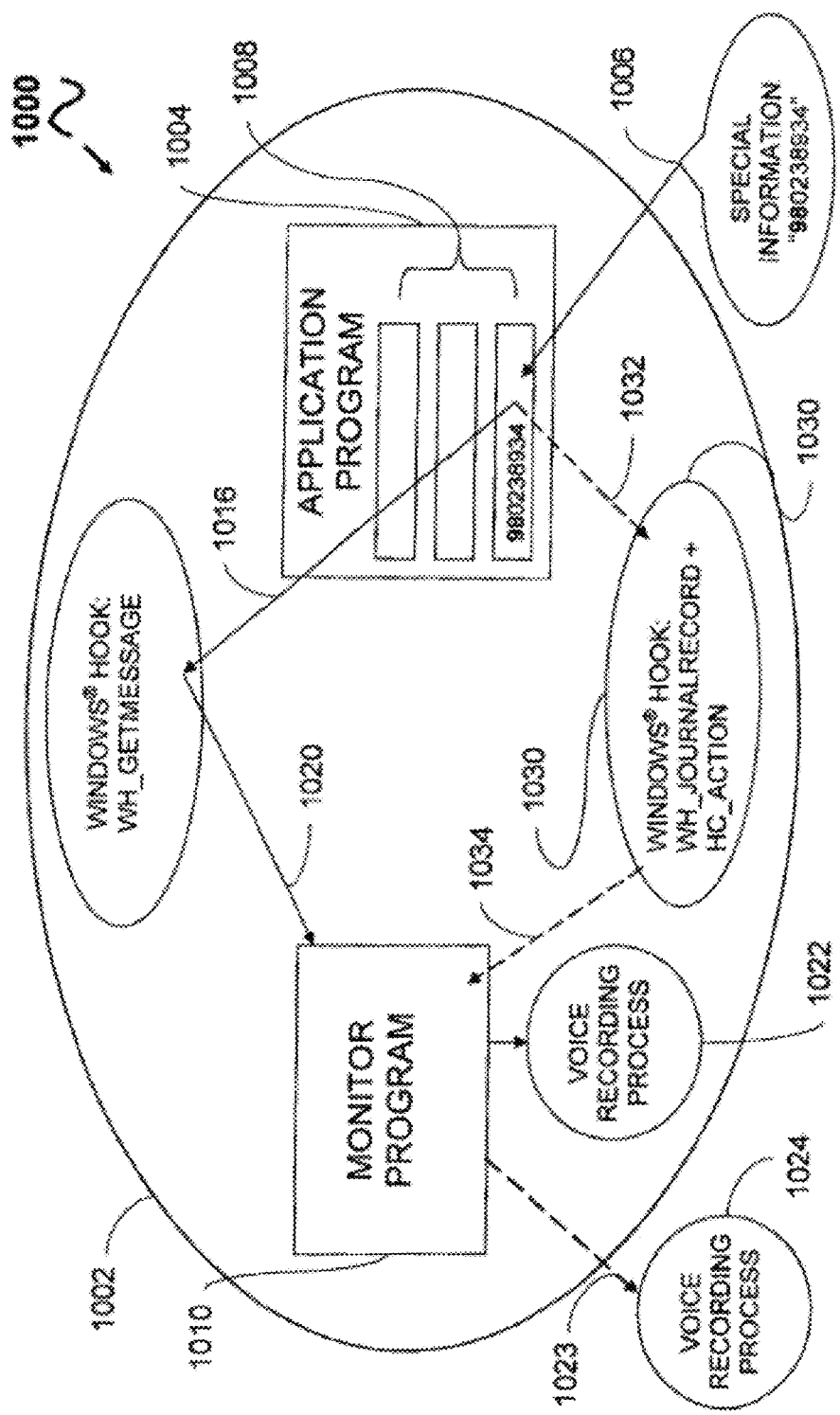
FIG. 10 depicts monitoring in a WINDOWS® environment according to embodiments of the invention.

FIG. 10 depicts monitoring in a WINDOWS® environment, generally at 1000, according to embodiments of the invention. With reference to FIG. 10, a WINDOWS® operating system environment is indicated at 1002 for a data processing system. A first application program 1004 contains fields 1008 that are used to input special information that pertains to a person. The first application program 1004 can be a legacy agent application, and is executed as a process within 1002. Such a legacy application program can be one that is used at some existing call centers to handle calls from people who contact a business entity. A second software application program' (monitor program) 1010 is executed as a separate process from the process that corresponds to the legacy agent application 1004. The program 1010 is configured to use one or more WINDOWS® "hooks." The "hooks" enable the program 1010 to receive information from the first application program 1004.

In one example, the WINDOWS® hook "WH_GETMESSAGE" is used by the program 1010 via 1020. The hook "WH_GETMESSAGE" directs virtual-key codes and/or pointing device (mouse) coordinates or positions along with an associated time that corresponds with the virtual-key code or the mouse coordinates to be passed via 1020 to the monitor program 1010 as indicated by a path 1020, which may originate from another program via 1016. Other alternatives exist, for example the WINDOWS® hook "WH_JOURNALRECORD" and the "HC_ACTION" hook code 1030 will allow the program 1010 to receive virtual-key codes and/or pointing device (mouse) positions along with associated times that corresponds with the keys and/or the mouse coordinates as indicated by a path 1034, which may originate from another program via 1032.

Special information 1006 input into one of the fields 1008 results in the program 1010 receiving times (via for example, 1016 and 1020 or 1032 and 1034) associated with activity in the user interface that corresponds to the input of a person's special information by an agent. The times so obtained can be sent to the voice recording process 1022. The voice recording process 1022 can use the times corresponding to the special information to process the voice recording, thereby rendering parts of a voice recording that correspond to the special information unintelligible.

In some embodiments, a voice recording process 1024 exists outside of the WINDOWS® operating system environment 1002. In such a configuration, the times corresponding to the input of special information are sent via 1023 to the voice recording process 1024 where parts of the voice recording are processed to render the special information contained therein unintelligible.

Note that embodiments of the invention are employed in a variety of hardware/software architectures, as was described in conjunction with the preceding figures. Within these varied architectures, a time base used for a voice recording system and a time base used for input of special information to a data processing system may not be the same, multiple clocks can be employed and an offset may exist between them. In order to accurately use times that correspond to user interface activity during the processing of a voice recording file it may be necessary to measure the offset between the two or more time bases. Such a measurement is useful when a voice recording system associates absolute time with a recording, since a data processing system usually reports or attempts to report (as limited by inherent inaccuracies) absolute time with associated keyboard and pointing device messages.

Voice recording systems that do not associate absolute time with a voice recording will need to be marked with an artifact that is relatable to a time base used by a data processing system used to enter the special information. The artifact corresponds with a known time. Measuring from the artifact permits the times associated with other locations within the voice recording to be correlated with times generated by the data processing system. In one embodiment, an artifact is recorded in a voice recording when a first activity associated with an input of special information occurs. In another embodiment, an artifact is recorded in a voice recording when a first activity associated with an input of any information pertaining to a person occurs. In yet another embodiment, an artifact is recorded in a voice recording when a person connects with an agent at a call center and a call is initiated.

In systems with multiple clocks or even in systems with a single clock it may be desirable to calibrate the clock(s) to a standard time reference such as an atomic clock. A standard time reference obtained from an atomic clock is accessible over the Internet and can be used for calibration by the clock(s) in the systems described herein when a connection to the Internet is available. In other instances, networks that are not connected to the Internet can maintain a reference clock that can be used for the purpose of calibration of individual clocks.

When a voice recording system, such as 1022, is operating within the WINDOWS® operating system environment 1002, a common system clock is available for both the voice recording process 1022 and the data entry events 1008 occurring within the user interface; thus the problem of an offset does not exist. In such a case, times obtained from the hooks described above can be used directly to process a voice recording; thereby rendering a part(s) of the voice recording corresponding to the special information unintelligible.

Figure 11:
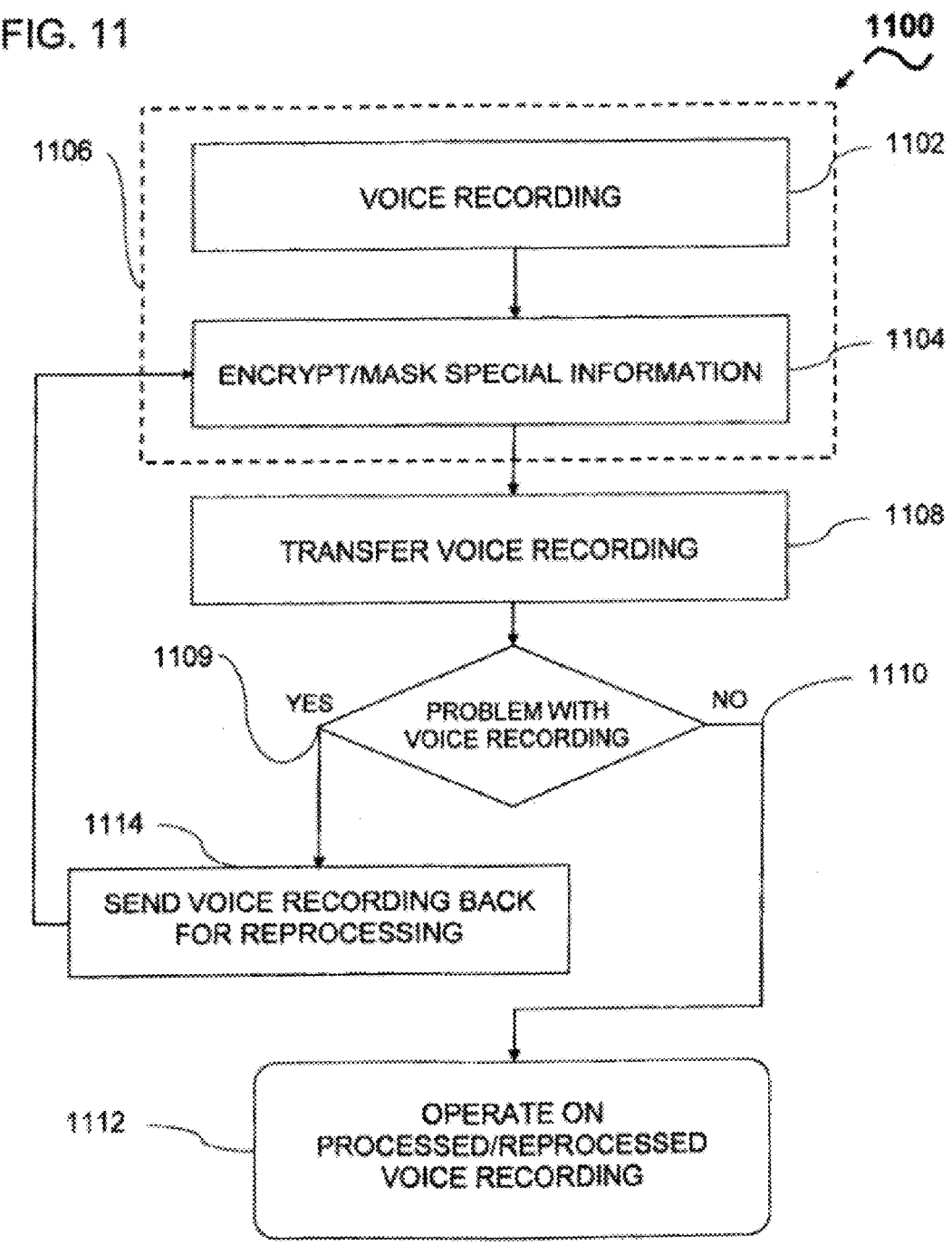
FIG. 11 illustrates reprocessing a voice recording according to embodiments of the invention.

FIG. 11 illustrates, generally at 1100, reprocessing a voice recording according to embodiments of the invention. As described above, a voice recording is processed to render locations within the voice recording that correspond to utterances of special information unintelligible. Reprocessing of these portions of the voice recording, to render them intelligible, can be performed when a reversible process is used to render the portions of the voice recording unintelligible. A reversible process is a process such as an encryption that is performed with a key so that a decryption can be performed to recover the original information that was previously encrypted. Processes for encryption/decryption utilizing keys are known to those of skill in the art and can be used within the various embodiments described herein.

With reference to FIG. 11, reprocessing voice recordings is described with respect to two entities, entity 1 and entity 2, generally at 1100. Entity 1 and entity 2 have different relationships with respect to the information contained within the voice recording. As described above, a voice recording 1102 is obtained from an interaction between a person and an interface of a business entity. The voice recording 1102 contains special information that entity 1 has a right to access; however, for the purpose of this description, entity 2 has a different relationship to the special information. In one or more embodiments, the relationship of entity 2 to the special information is one of having less right to access the special information than entity 1 has. In this example, the special information is rendered unintelligible, at block 1104. Block 1106 identifies a general realm where the special information is intelligible within the voice recording and the special information within the voice recording is under the control or agency of entity 1. When the voice recording flows outside of block 1106 the special information is rendered unintelligible before reaching entity 2 at block 1108.

Entity 2 receives a processed voice recording at block 1108. Entity 2 can use the processed voice recording in a variety of ways. For example, some of the ways are, but are not limited to, analysis of the processed voice recordings, fulfillment of an order for goods or services, etc. Analyses of the processed voice recording can have various purposes, such as for establishing a quality of service rendered, estimating competence of the interface of the business entity used to interact with the person who utters the special information, etc. Other purposes include, but are not limited to, recommending a change to one or more functions of the business. Such changes can include, for example, improving an efficiency of an interface between a business entity and people who interact with the business entity.

Entity 2 may determine that there is some need to reprocess the processed voice recording. For example, a problem with an unintelligible portion of a processed voice recording is found at 1109. Such a problem could be that too much of the voice recording was rendered unintelligible during the initial processing or that too little of the voice recording was rendered unintelligible during the initial processing. In such instances, the processed voice recording is sent back to entity 1 at block 1114 for reprocessing at block 1104. If a reversible process was used to process the portion of the voice recording that has the problem, entity 1 reverses the process and takes appropriate action to correct the problem with the portion of the voice recording that was rendered unintelligible. Appropriate action can involve reprocessing the portion of the voice recording at issue with different processing parameters. Different processing parameters can be applied to the voice recording, such as time window width, guard band(s) width, correlation adjustments, etc.

The reprocessed voice recording is transferred back to entity 2 at block 1108. If there is no need for further reprocessing, the voice recording is passed to block 1112, via path 1110, where entity 2 can operate on the processed or reprocessed voice recording. The operations (alternatively referred to as analysis) can vary according to the use-case of interest as described above.

Entity 2 can function in a variety of roles with respect to the voice recording, such as but not limited to, an agent or a contractor for entity 1, various contractual relationships can exist between entity 1 and entity 2. Entity 2 can have varying degrees of access to the special information contained within the voice recording depending on the contractual relationship between entity 1 and entity 2.

In the arrangement described above, entity 1 maintains control of a key(s) used for the processing (encryption/decryption). Due to entity 2's different or limited relationship to the special information, entity 2 does not have access to the key(s) and cannot reprocess the voice recording. Such an arrangement provides security and limited access to the special information contained within the voice recording. It will be noted that entity 1 can authorize another entity, such as an entity 3 (not shown) to reprocess the voice recording. In such a case, the third party can be entrusted with a key(s) needed to process (encrypt/decrypt) the voice recordings. Note that a contractual relationship can exist between entity 1 and entity 3 that could be different from a contractual relationship between entity 1 and entity 2.

Figure 12:
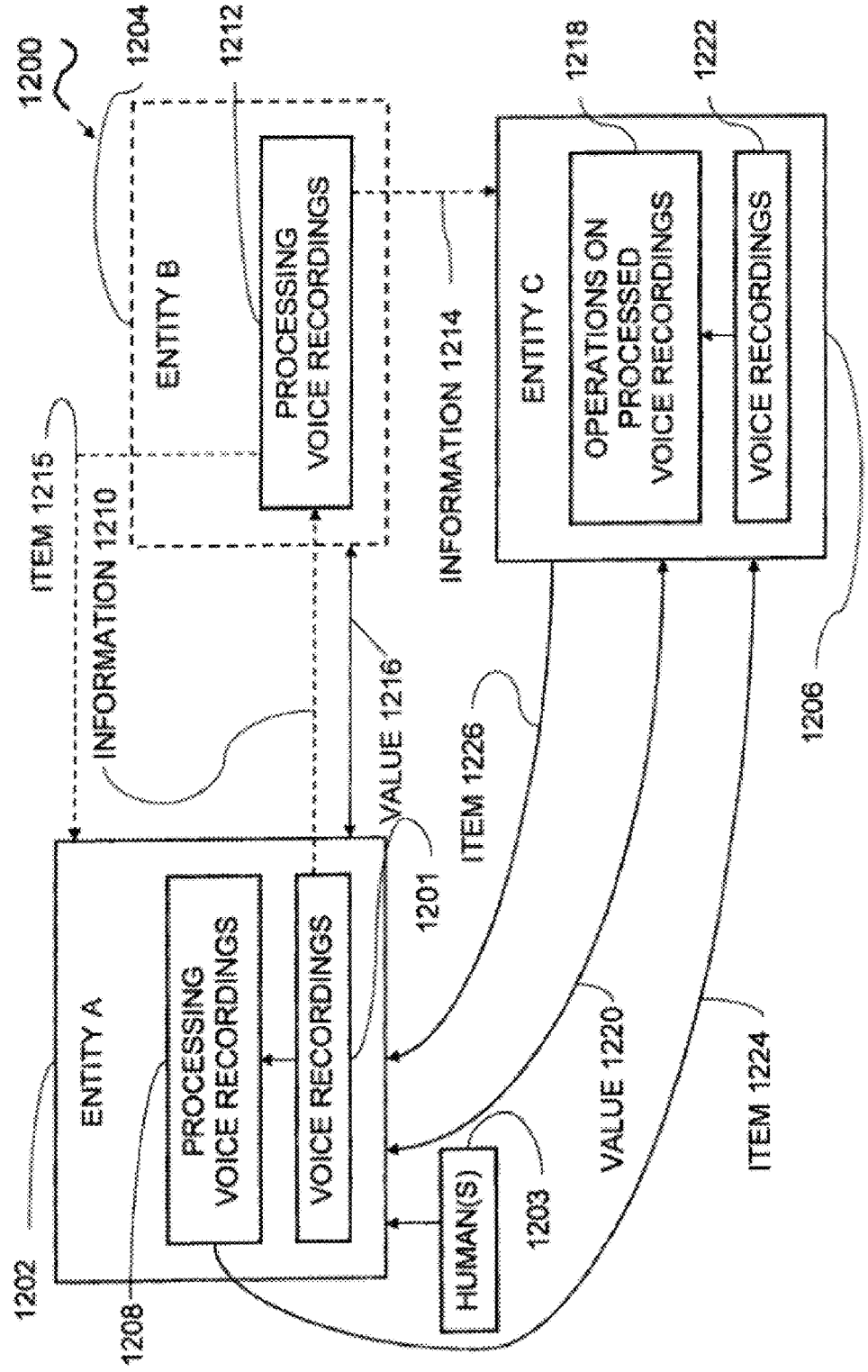
FIG. 12 illustrates information and value flow according to embodiments of the invention.

FIG. 12 illustrates, generally at 1200, information and value flow according to embodiments of the invention. With reference to FIG. 12, an entity A, indicated at 1202, has under its control voice recordings 1201 that contain special information obtained from a human(s) 1203. A contractual relationship(s) can exist between the human(s) 1203 and the entity A 1202. Note that the contractual relationship(s) will reflect terms associated with a use-case. As described above, special information can be confidential information, secret information, private information, etc., information that is generally considered not to be appropriate or lawful for all entities to access or possess. The special information is rendered unintelligible at block 1208.

Alternatively, an entity B, indicated at 1204, can process the voice recordings 1212 to render unintelligible the special information contained therein. In some embodiments, the entity B will associate an identifier with a voice recording that contains special information (as described above in conjunction with the preceding figures). In some cases, the identifier will mark or flag a voice recording, thereby providing notice of special information, without rendering the special information, contained therein, unintelligible. Such marking can also provide notice that a voice recording is "clean" and does not contain special information. A contractual relationship can exist between the entity A 1202 and the entity B 1204. In one embodiment, information flows from the entity A 1202 to the entity B 1204 along a path 1210. Value 1216 can flow from the entity A 1202 to the entity B 1204 to provide compensation for the processing performed by the entity B 1204 on the voice recordings. In one or more embodiments, value 1216 takes the form of a debit or a credit that is transferred in exchange for services provided by the entity B 1204. An example of a debit is an invoice or a bill to show what is owed and an example of a credit is payment in the form of valuable consideration.

A contractual relationship can exist between the entity B 1204 and the entity C 1206 and a contractual relationship can exist between the entity C 1206 and the entity A 1202. In one embodiment, the processed voice recordings can flow from the entity B 1204 along various paths to one or more entities, such as the entity C 1206 and/or the entity A 1202. The processed voice recordings can flow as information 1214 to an entity C at 1206. In one embodiment, the entity C 1206 can perform operations (analysis) on the processed voice recordings as previously described. The operations can vary according to the use-case of interest as described above. Such operations can include, but are not limited to, performing analysis on the quality of service provided by an agent during a customer-agent interaction, etc. Output from the operations performed by the entity C 1206, on the voice recordings, can flow as item 1226 to the entity A 1202. The entity C 1206 can also function as a data custodian, thereby providing storage of the processed voice recordings. The processed voice recordings 1212 can flow as item 1215 to the entity A 1202.

In one embodiment, the processed voice recordings can flow as item 1224 from the entity A 1202 to the entity C 1206. The entity C 1206 can perform operations on the processed voice recordings as previously described. Value 1220 can flow from the entity A 1202 to the entity C 1206 and the item 1226 rendered by the entity C 1206 can flow to the entity A 1202. In exchange 'for the services/goods rendered by the entity C 1206, value 1220 can flow from the entity A 1202 to the entity C 1206. Note that item 1215, item 1224, and item 1226 can be provided in various forms or formats. Such forms or formats include, but are not limited to, printed, written, video, audio, multimedia, live presentation, oral communication, electronic, etc.

In various embodiments, control and beneficial use of a system implemented as described in this description of embodiments, inure to the benefit of a person who uses such a system to contact a business entity. The person benefits from the enhanced security afforded to the person's special information, as well as benefiting from the efficiency, and improved business practices that the business entity is capable of providing to the person. Thus, a person uses such a system to his or her benefit and controls the system by initiating an interaction with a business. In one or more embodiments, such an interaction is in the form of a voice communication, i.e., a call. In controlling a system, a person (a caller) initiates an interaction (a call) with a business, thereby, activating the system to obtain a service, services, a good, goods, etc. which is the object of the call so placed with the business, while benefiting from the protection afforded to the person's special information. The person is in control of the interaction with the business and can terminate the interaction at will. Thus, the person controls the system.

In various embodiments, the systems described in this description of embodiments provide tools that a business entity can use to improve various aspects of its business operations. In one or more embodiments, beneficial use of such systems can also inure to the business entity. In one example, processing a speech signal to render unintelligible a person's special information, allows a business entity to comply with various laws that pertain to such information, while simultaneously allowing the business entity to improve or manage itself more effectively. Such benefit, e.g., improvement or management is accomplished, for example, through' application of the processed voice recordings as embodied in the analysis thereof. Analysis of (alternatively referred to as operations on) the processed voice recordings can be fed back to a business in various forms or formats. Such forms or formats include, but are not limited to, printed, written, video, audio, multimedia, live presentation, oral communication, electronic, etc.

Alternatively, or in addition to analysis provided to a business by a separate entity, a business may choose to perform its own analysis on the processed voice recordings. Analysis or operations on processed voice recordings, as used within this detailed description of embodiments, is to be afforded broad meaning, including but not limited to, establishing a quality of service rendered during an interaction between an interface of a business and a person. Analysis also includes, but is not limited to, assessing the accuracy of service provided, goods provided, etc. by an interface of a business and a person. As noted previously, the interface of a business is either a human agent or an electronic agent.

Note that a speech signal can exist in a variety of forms, such as a static form as in a voice recording or a dynamic form as in an acoustic wave uttered by a human, data in transit within a circuit, system, network, etc. Those of skill in the art will appreciate that the techniques and apparatuses described herein are applicable to processing a speech signal as contained in a voice recording as well as to processing a speech signal input into a system, where the speech signal is processed before the voice recording is created. Such processing can be performed, for example, in real-time or near real-time, as described above, but is not limited to these cases. Data can exist in digital form, in analog form or can be transformed from one form to another according to a particular implementation. Furthermore, the speech signal can be processed in real-time, near real-time or can be time-delayed by buffering, etc. before processing to render unintelligible a person's special information.

For purposes of discussing and understanding embodiments of the invention described herein, it is to be understood that various terms are used by those knowledgeable in the art to describe techniques and approaches. Furthermore, in this description, for purposes of explanation, numerous specific details are set forth in order to provide a thorough understanding of the embodiments of the invention presented. It will be evident, however, to one of ordinary skill in the art that embodiments of the invention may be practiced without these specific details. In some instances, well-known structures and devices are shown in block diagram form, rather than in detail, in order to avoid obscuring embodiments of the invention. These embodiments are described in sufficient detail to enable those of ordinary skill in the art to practice the invention, and it is to be understood that other embodiments may be utilized and that logical, mechanical, electrical, and other changes may be made without departing from the scope of the embodiments of the invention described.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement embodiments of the invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, Digital Versatile Disk (DVD), compact disk-read only memories (CD-ROM5), and magnetic-optical disks, read-only memories (ROM5), random access memories (RAMs), electrically programmable read-only memories (EPROM)s, electrically erasable programmable read-only memories (EEPROM5), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to embodiments of the invention can be implemented in hard-wired circuitry, by programming a general-purpose processor, or by any combination of hardware and software. One of ordinary skill in the art will immediately appreciate that embodiments of the invention can be practiced with computer system configurations other than those described, including hand-held devices, multi-processor systems, microprocessor-based or programmable consumer electronics, digital signal processing (DSP) devices, set top boxes, network PC5, minicomputers, mainframe computers, and the like. Embodiments of the invention can also be practiced in distributed computing environments where tasks are performed by remote processing devices that are linked through a communications network.

The methods described within embodiments of the invention may be implemented using computer software. If written in a programming language conforming to a recognized standard, sequences of instructions designed to implement the methods can be compiled for execution on a variety of hardware platforms and for interface to a variety of operating systems. In addition, the embodiments of the invention presented are not described with reference to any particular programming language. It will be appreciated that a variety of programming languages may be used to implement the teachings of the embodiments of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and. communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques described in embodiments of the invention may be practiced as well as implemented as an embodiment thereof).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

As used in this description, "one embodiment" or "an embodiment" or similar phrases mean that the feature(s) being described is included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

While the invention has been described in terms of several embodiments, those of skill in the art will recognize that the invention is not limited to the embodiments described, but can be practiced with modification and alteration within the spirit and scope of the appended claims. The description is thus to be regarded as illustrative instead of limiting.

What is claimed is:

1. A computer-implemented system for correlating activity within a user interface with special information, comprising:
    a voice recording comprising special information; and
    a processor to:
        provide data entry fields within a user interface, wherein one or more of the data entry fields is designated for the special information;
        obtain a first image of at least a portion of the user interface with at least one of the data entry fields designated for special information at an initial time;
        obtain a second image of the same portion of the user interface at a later time;
        compare the first and second images;
        determine based on the comparison, data in the second image in the data entry field designated for special information, not present in the first image, wherein the data in the second image is identified as special information and correlated with at least a portion of the special information in the voice recording;
        automatically render the data in the data entry field designated for special information unintelligible upon identification of the data; and
    render the correlated special information in the voice recording unintelligible.

2. A system according to claim 1, wherein the processor records a time of the entry of the special information.

3. A system according to claim 1, wherein the special information is received via one of a stylus, mouse, keyboard, and voice activation.

4. A system according to claim 1, wherein the processor monitors a call associated with the voice recording and receives the data in response to a request for information during the call.

5. A system according to claim 1, wherein the processor records the call and marks at least one of a beginning and an end of the special information in the voice recording.

6. A system according to claim 1, wherein the processor records the call and marks at least one of a beginning and an end of the special information in the voice recording.

7. A system according to claim 1, wherein the processor transfers the voice recording with unintelligible special information to a third party.

8. A system according to claim 1, wherein rendering of the special information comprises one of encrypting the special information, masking the special information, and deleting the special information.

9. A system according to claim 1, wherein the special information comprises information to which access is limited.

10. A computer-implemented method for correlating activity within a user interface with special information, comprising:
    obtaining a voice recording comprising special information;
    providing a user interface with data entry fields, wherein one or more of the data entry fields is designated for the special information;
    at an initial time, obtaining a first image of at least a portion of the user interface with at least one of the data entry fields designated for special information;
    at a later time, obtaining a second image of the same portion of the user interface;
    comparing the first and second images;
    determining based on the comparison, data in the second image in the data entry field designated for special information, not present in the first image, wherein the data in the second image is identified as special information and correlated with at least a portion of the special information in the voice recording;
    automatically rendering the data in the data entry field designated for special information unintelligible upon identification of the data; and
render the correlated special information in the voice recording unintelligible, wherein the steps are performed by a processor.

11. A method according to claim 10, further comprising: recording a time of the entry of the special information.

12. A method according to claim 10, further comprising: receiving the special information via one of a stylus, mouse, keyboard, and voice activation.

13. A method according to claim 10, further comprising: monitoring a call associated with the voice recording; and receiving the data in response to a request for information during the call.

14. A method according to claim 10, further comprising: marking at least one of a beginning and an end of the special information in the voice recording.

15. A method according to claim 14, further comprising utilizing the markers to identify at least one of a beginning and end of the special information in the voice recording.

16. A method according to claim 10, further comprising: transferring the voice recording with the unintelligible special information to a third party.

17. A method according to claim 10, wherein rendering of the special information comprises one of encrypting the special information, masking the special information, and deleting the special information.

18. A method according to claim 10, wherein the special information comprises information to which access is limited.

\* \* \* \* \*

UNITED STATES PATENT AND TRADEMARK OFFICE
CERTIFICATE OF CORRECTION

PATENT NO. : 9,953,147 B2
APPLICATION NO. : 14/281842
DATED : April 24, 2018
INVENTOR(S) : G. Kevin Doren It is certified that error appears in the above-identified patent and that said Letters Patent is hereby corrected as shown below:

In the Claims

Column 22, Lines 4-6, cancel the text beginning with "6. A system according" to and ending "in the voice recording." and insert the following claim:
-- 6. A system according to Claim 5, wherein the processor utilizes the markers to identify at least one of a beginning and end of the special information in the voice recording. --

Signed and Sealed this
Third Day of July, 2018

Andrei Iancu
*Director of the United States Patent and Trademark Office*